(12) United States Patent
Onnela et al.

(10) Patent No.: US 6,544,155 B2
(45) Date of Patent: Apr. 8, 2003

(54) ARRANGEMENT FOR REMOVING OIL FROM A ROLL

(75) Inventors: Jori Onnela, Jyväskylä (FI); Sami Vanhamäki, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/104,160

(22) Filed: Mar. 22, 2002

(65) Prior Publication Data

US 2002/0115544 A1 Aug. 22, 2002

Related U.S. Application Data

(62) Division of application No. 09/605,214, filed on Jun. 28, 2000, now Pat. No. 6,454,685.

(30) Foreign Application Priority Data

Jul. 6, 1999 (FI) .................................................. 991539

(51) Int. Cl.⁷ ............................................... B23P 15/00
(52) U.S. Cl. .............................. 492/7; 492/16; 492/20; 162/272
(58) Field of Search .............................. 492/16, 20, 7; 162/358.3, 272

(56) References Cited

U.S. PATENT DOCUMENTS

| | | | | |
|---|---|---|---|---|
| 5,645,517 A | * | 7/1997 | Stotz | 492/7 |
| 5,846,173 A | * | 12/1998 | Grabscheid et al. | 492/7 |
| 6,206,813 B1 | * | 3/2001 | Nikulainen | 492/16 |

* cited by examiner

Primary Examiner—I Cuda-Rosenbaum
(74) Attorney, Agent, or Firm—Fildes & Outland, PC.

(57) ABSTRACT

An arrangement is disclosed for removing oil from a roll, in which, inside a rotatable shell, there is a fixed axle beam, which supports loading shoes directed against the inner surface of the shell. An oil guide attached to the loading shoes creates an inwardly-directed jet of oil, next to and at a short distance from which a collector trough is located. The oil guide and an auxiliary guide attached to the collector trough guide and cancel the oil jet against the collector trough. The oil is removed to an outlet pipe through a low gap in the bottom of the collector trough.

6 Claims, 4 Drawing Sheets

ARRANGEMENT FOR REMOVING OIL FROM A ROLL

CROSS REFERENCE TO RELATED APPLICATION

This is a divisional application of prior application Ser. No. 09/605,214 filed Jun. 28, 2000 now U.S. Pat. No. 6,454,685.

FIELD OF THE INVENTION

This invention relates to an arrangement for removing oil from a roll, in which, inside a rotatable shell, there is a fixed axle-beam, supporting loading shoes acting on the inner surface of the shell, and in which roll there are devices for removing oil from the roll, comprising an oil guide attached to the loading shoes, a collector trough, and oil-removal piping, of which the oil guide is arranged to form an oil jet directed into the roll, the removal of the oil from the roll being arranged to take place with the aid of the pressure difference.

BACKGROUND OF THE INVENTION

Problems with deflection-compensated rolls include oil frothing and poor oil removal from inside the roll. In addition to oil leaking from the loading shoes, oil may be sprayed against the inside of the roll shell to cool or heat it. It is important that the oil is collected as soon as possible from inside the roll, so that frothing of the oil, and thus the air mixed with it, remains as little as possible. When the roll rotates, a film of oil travels around its inner surface, colliding with the stationary loading shoes. In the solution according to U.S. Pat. No. 5,853,359, the lubricating oil colliding with the loading shoes is allowed to flow by gravity to a lower trough, from which it is sucked out of the roll. If the loading shoes are low down, a special scraper is used, from which the oil flows into the trough in a corresponding manner. Such a construction demands a considerable amount of space, which is not available in most rolls. A somewhat similar construction is disclosed in Finnish patent application 982045, in which the gravity-induced flow is directed to a special collection space, which may be located as a low construction on the outer surface of the cylindrical axle. WO publication 98/38381 discloses a special guide, to be attached to the loading shoes, by means of which a jet, directed towards a trough beneath, is formed from the film of oil traveling along the inner surface of the roll. In this case, the oil-removal guide must be set at a higher level, because removal takes place, at least partially, by gravity into the lower trough. A corresponding solution cannot be used in connection with a loading shoe set at a lower level.

SUMMARY OF THE INVENTION

The present invention provides an arrangement which will permit the removal of oil in any position at all.

The method for removing oil from a roll, in which, inside a rotatable shell, there is a fixed axle beam, which supports loading shoes directed against the inner surface of the shell, and in which roll there are devices for removing the oil from the roll, comprising an oil guide attached to the loading shoes, a collector trough and oil-removal piping, of which the oil guide is arranged to create a jet of oil directed inside the roll and the transfer of the oil out of the roll is arranged to take place with the aid of a pressure difference, is characterized in that the collector trough is located a short distance from the oil jet and the related auxiliary guide, which, together with the oil guide is arranged to guide and channel the oil jet against the trough, and that the oil is removed to the outlet pipe through a low gap in the bottom of the collector trough.

The arrangement in a roll equipped with loading shoes, in which, inside a rotatable shell, there is a fixed axle beam, supporting the loading shoes directed against the inner surface of the shell, and in which shell there are devices for removing oil from the roll, comprising an oil guide attached to the loading shoes, a collector trough, and oil-removal piping, of which the oil guide is arranged to form an oil jet directed inside the roll and the transfer of the oil out of the roll is arranged to take place with the aid of a pressure difference, is characterized in that the collector trough includes an auxiliary guide and that it is locates at a short distance from the oil guide of the loading shoe, in such a way that it turns the oil jet to the bottom of the collector trough, and that there is a gap in the bottom of the collector trough leading to the outlet pipe.

Utilizing the method according to the invention, oil is removed rapidly and with a good degree of control, in a small space. According to one preferred embodiment, each loading shoe incorporates a guide of the same width as the shoe, for creating an oil jet, whereas the collector trough receiving the oil and its auxiliary guide and removal pipe are essentially the same width as the roll shell.

These and other features and advantages of the invention will be more fully understood from the following detailed description of the invention taken together with the accompanying drawings.

BRIEF DESCRIPTION OF THE DRAWINGS

In the drawings:

FIG. 6a shows a variation of the oil-removal arrangement of FIG. 2a.

DETAILED DESCRIPTION OF THE INVENTION

Figure 1:
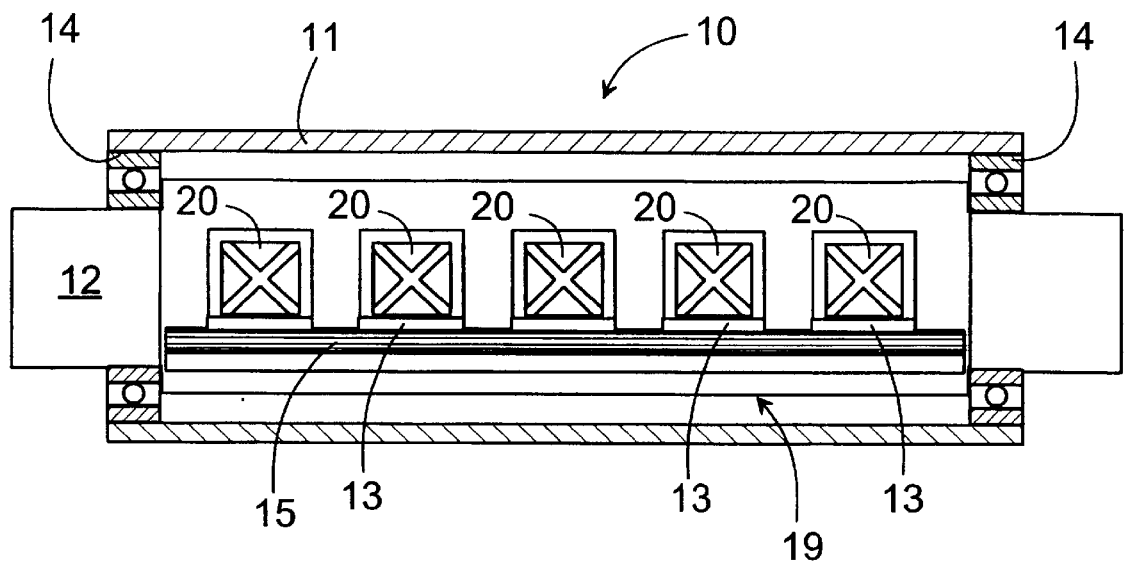
FIG. 1 shows a cross-section of a roll, in which an oil-removal arrangement according to the invention is attached to the loading shoes.

In the deflection-compensated roll 10 according to FIG. 1, there is a stationary axle 12, on which the loading shoes 20 are installed. Here, reference number 20 is used to mark the moving part of the loading shoes, which, in this case, is a cylindrical component. The roll shell 11 is arranged to rotate in a known manner, with the aid of bearing devices (14). Loading shoes 20 press on roll shell 11, in a manner that is, as such, known, while the related oil-feed system can be used to load the roll shell from inside, according to the desired profile.

With reference to FIG. 1, loading shoes 20 and the related oil guide 13 extend to the inner surface of roll shell 11. According to FIG. 1, oil guides 13 are essentially the same width as loading shoes 20 and, at the shoes, guide the oil traveling along the inner surface of roll shell 11, as an oil jet essentially in a radial direction to collector trough 19.

Figure 2A:
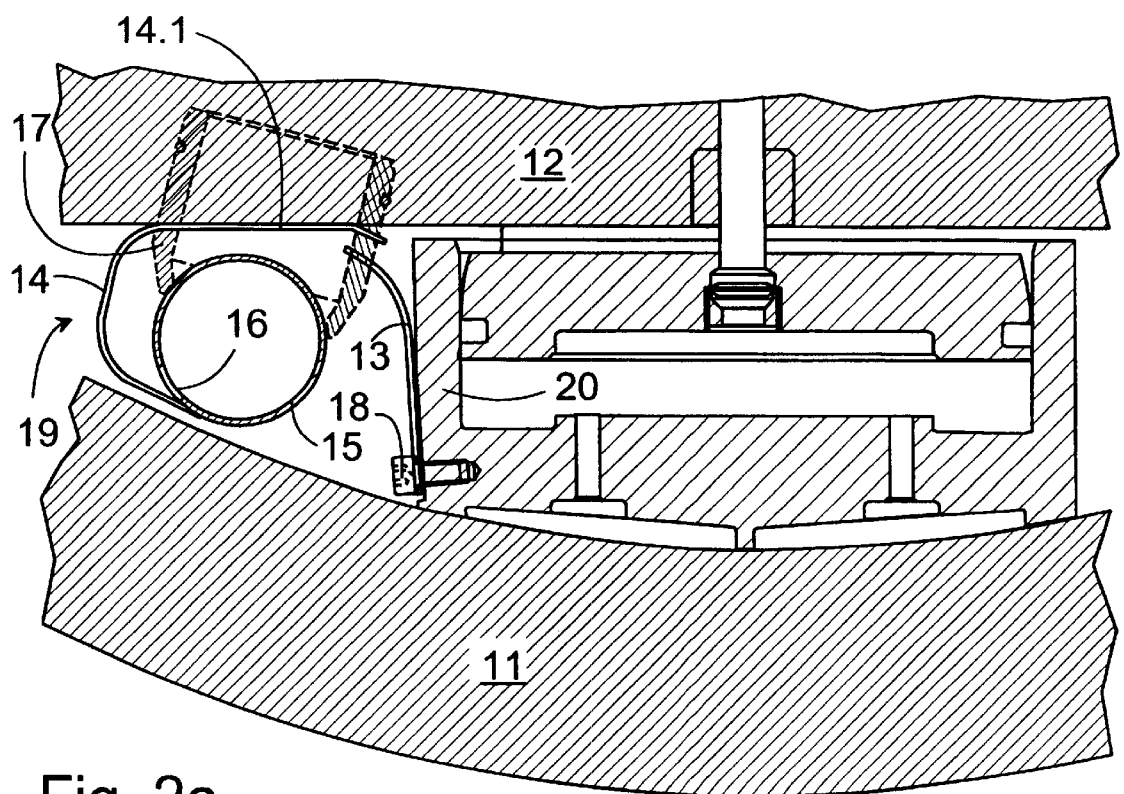
FIG. 2 shows a partly enlarged cross-section at the loading shoe, more precisely of the oil-removal arrangement located at its side.
FIG. 2b shows the operation of the oil-removal arrangement.

The construction of the oil-removal devices is shown in detail in FIG. 2a, in which there is a partly enlarged cross-section at the loading shoe. Loading shoe 20 or more precisely its cylindrical part, move in a radial direction, according to the load of the loading shoe. Oil guide 13, which throws the oil to collector trough 19, which is formed by outlet pipe 15 and in this case sheet-metal casing 14, is attached to this cylindrical part by means of bolts 18. The end part 14.1 of the casing forms an auxiliary guide, which turns the oil jet, in the manner described later, to the bottom of the collector trough, in which there is a gap 16 connecting to outlet pipe 15. This gap 16 is slightly narrower than the plate-like oil guide 13 and loading shoe 20. Outlet pipe 15 and collector trough 19 extend continuously over the entire width of the row of loading shoes (see FIG. 1). Oil is led with the aid of connector pipe 17 from outlet pipe 15 to an external outlet channel. The removal of the oil can, as such, take place either by means of excess pressure or a vacuum. Excess pressure is created by feeding compressed air into the roll, whereas a vacuum is created with the aid of a vacuum pump connected to the outlet pipe.

Oil collection can be further improved by widening the oil guides and correspondingly the gaps of the outlet pipe.

Figure 6A:
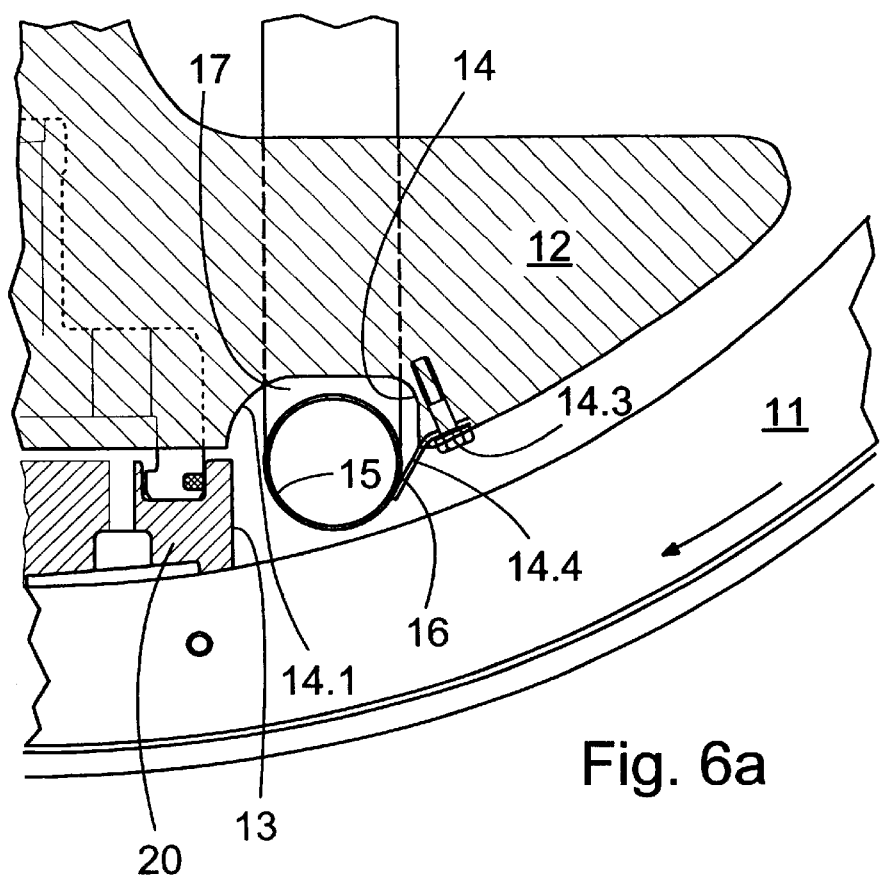

Most of the collector trough can be formed by machining it into the axle, as shown in FIG. 6a. The same reference numbers as previously are used for functionally similar components. In this case, a small part of the collector trough is formed by sheet-metal strip 14.4, which carries outlet pipe 15 and which is secured to axle 12 by means of bolts 14.3.

Figure 2B:
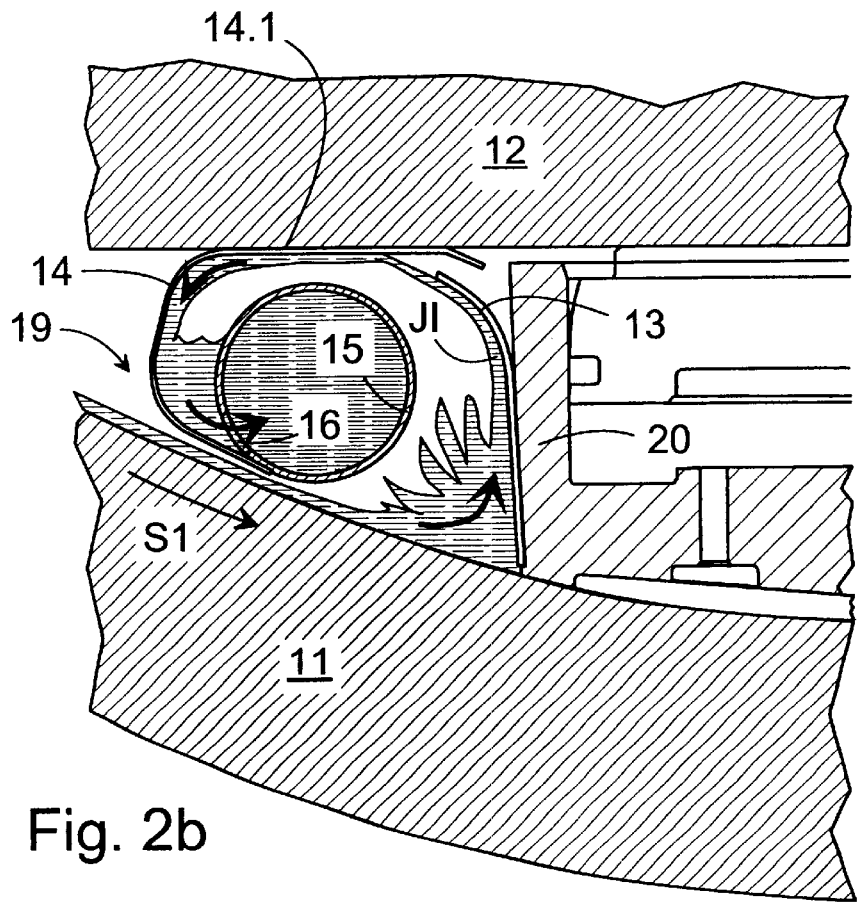

According to FIG. 2b, the roll shell, which rotates rapidly in the direction S1, brings a flow of oil against loading shoe 20 and oil guide 13, the kinetic-energy of the oil creating a damming pressure at the intersection of oil guide 13 and roll shell 11. This creates an oil jet J1, which discharges along oil guide 13, which is aimed in the direction of auxiliary guide 14.1 of collector trough 19, which further leads it to the bottom of the collector trough, the other side of which is formed by outlet pipe 15. A layer of oil, which prevents air from entering outlet pipe 15, forms on top of gap 16 in the lower part of outlet pipe 15. At the same time, this oil layer cancels the remaining kinetic-energy in the jet, calming the flow at this stage at the latest. The depth of the oil layer forming on top of gap 16 is adjusted by controlling the vacuum or excess pressure in outlet pipe 15. The final cancellation of the jet in the trough can take place in some other way, as long as a layer of oil collects on top of the gap.

Figure 3:
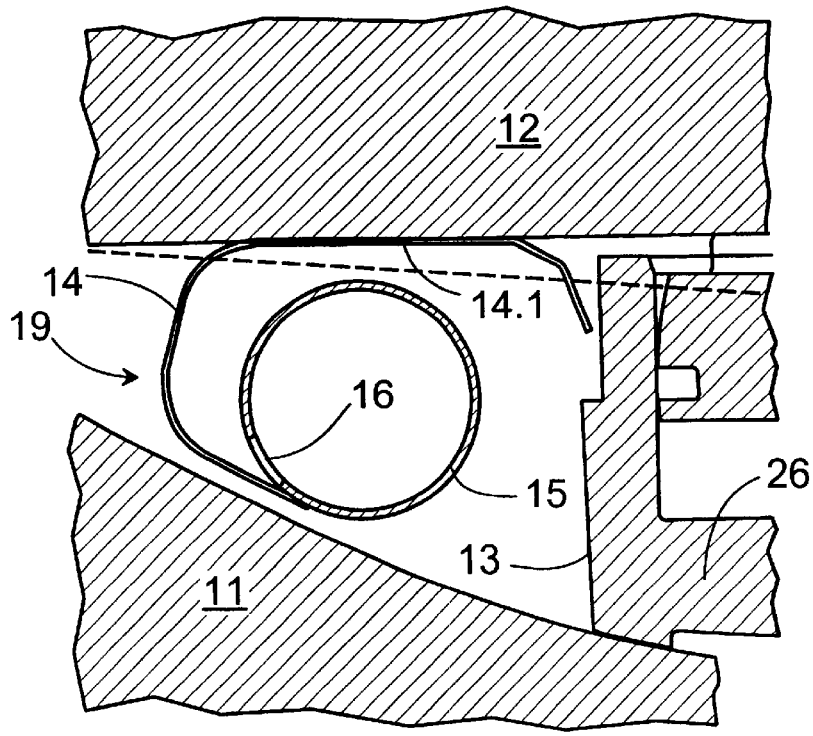
FIG. 3 shows another oil-removal arrangement according to the invention.

FIG. 3 shows a variation of the oil guide. This oil guide 13 is formed most simply by a flow surface shaped in the loading shoe, which is vertical in FIG. 3, but which continues as a hole, to which auxiliary guide 14.1 of collector trough 19 extends. In this case, oil guide 13 forms an oil jet in the same way, which can be easily directed to auxiliary guide 14.1 and from it onwards to the bottom of collector trough 19. It is always essential for there to be a gap between oil guide 13 and auxiliary guide 14.1, which permits the loading shoe to move radially. Except for the guide surfaces, the oil jet follows this narrow gap, so that its movement is very well controlled.

Figure 4:
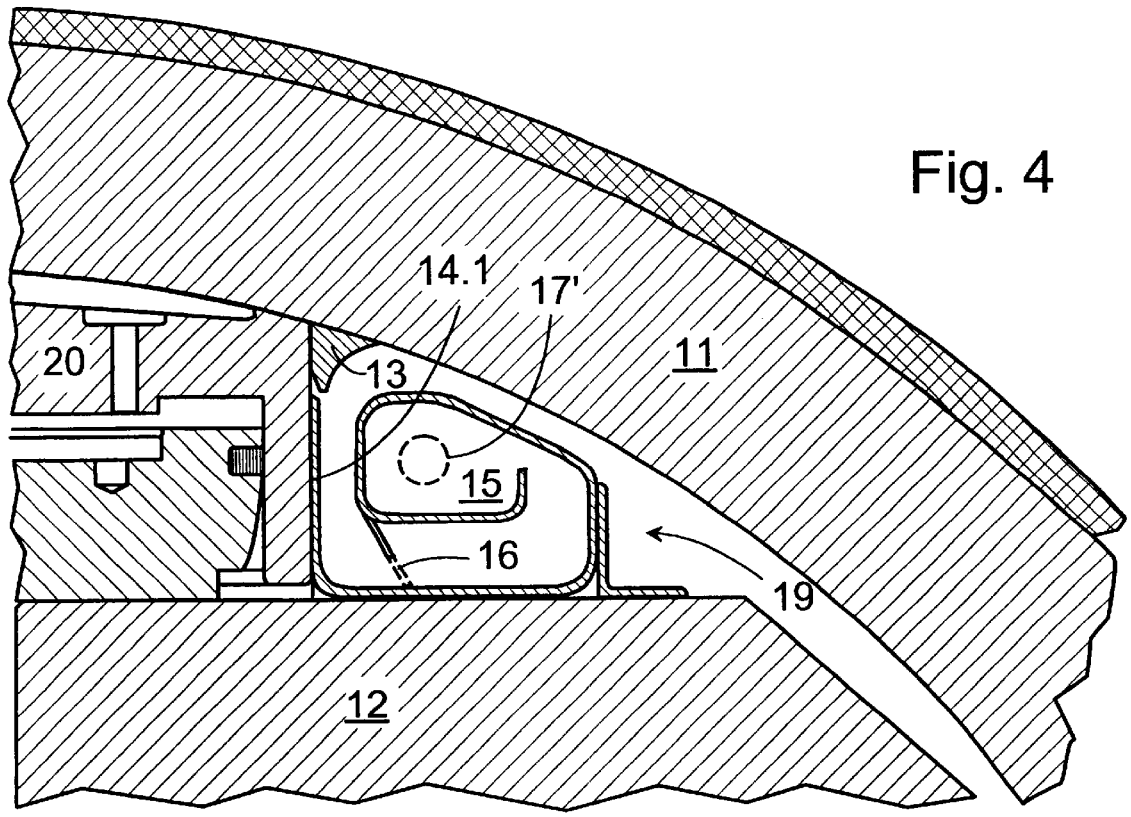
FIG. 4 shows an oil-removal arrangement according to the invention, located in an upper position.

The oil-removal arrangement according to FIG. 4 according to the invention can be located in any position at all. In this case, oil guide 13 attached to loading shoe 20 forms the oil jet and turns it nearly as much as required, with auxiliary guide 14.1 forming part of the actual oil-removal arrangement only guiding it in a straight form to the bottom of the collector trough. The trough has a spiral shape, with outlet pipe 15 forming its inner part. The opening in its lower part is blocked at regular intervals, thus forming gaps 16 for transferring the oil to the operational outlet pipe. The suction opening 17' in the end of the outlet pipe is shown in the figure by broken lines.

Figure 6B:
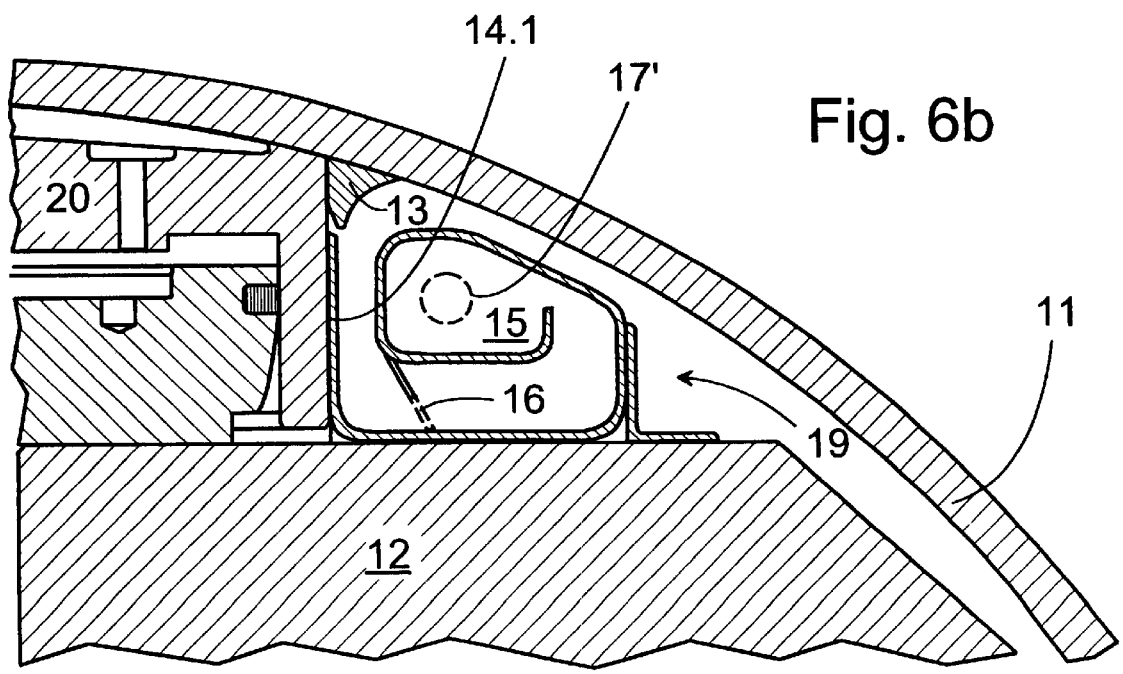
FIG. 6b shows an oil-removal arrangement according to the invention, located in the upper position.

The oil-removal arrangement according to the invention can also be applied in connection with a shoe press roller, according to FIG. 6b. In this case, the embodiment corresponds to the oil-removal arrangement shown in FIG. 4. In the shoe press roller embodiment, the shell 11 is the belt casing, which is usually about 3–5 mm thick. Despite the thinness of the belt casing, the oil-removal arrangement works well, as the belt casing is sufficiently stable immediately before loading shoe 20.

Figure 5:
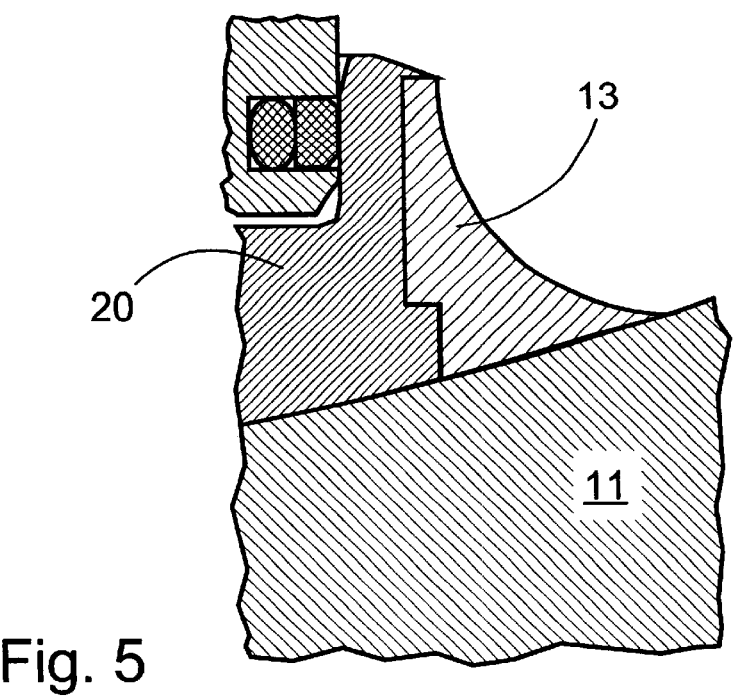
FIG. 5 shows a variation of the oil guide, attached to one type of loading shoe.

In the case according to FIG. 2b, the flow energy of the oil is to a great extent cancelled already against the loading shoe and the guide in it. If a relatively more powerful jet, for example at a lower circumferential velocity, is desired, an oil guide 13 according to FIG. 5, for example, is used in which a curved oil-guide piece is attached to loading shoe 20, which piece turns the oil layer on the inner surface of the roll shell 11, with small losses, into an inwardly-directed jet, at which point an oil collector trough with an auxiliary guide is placed in the manner disclosed previously.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. An arrangement in a roll equipped with loading shoes, in which, inside a rotatable shell, there is a fixed axle beam, supporting the loading shoes directed against the inner surface of the shell, and in which shell there are devices for removing oil from the roll, comprising an oil guide attached to the loading shoes, a collector trough, and oil-removal piping, of which the oil guide is arranged to form an oil jet directed inside the roll and the transfer of the oil out of the roll is arranged to take place with the aid of a pressure difference, characterized in that the collector trough includes an auxiliary guide and that it is located a short distance from the oil guide of the loading shoe, in such a way that it turns the oil jet to the bottom of the collector trough, and that there is a gap in the bottom of the collector trough leading to the outlet pipe.

2. The arrangement of claim 1, characterized in that the oil guide of the loading shoe has a curved shaped, curving from a tangential to a radial direction.

3. The arrangement of claim 1, characterized in that the collector trough is formed by a sheet-metal casing and/or by the machined surface of the axle and by the outlet pipe, which forms the other side of the collector trough.

4. The arrangement of claim 3, characterized in that the collector trough is open on the side with the oil guide and its casing forms an auxiliary guide.

5. The arrangement of claim 1, characterized in that the oil guide is machined into the side of the loading shoe.

6. The arrangement of claim 1, characterized in that the collector trough is arranged close to a loading shoe, which is arranged to load the roll shell of a deflection-compensated roll or the belt cover of a shoe press roller.

* * * * *